(12) United States Patent
Giliberto et al.

(10) Patent No.: US 7,389,334 B2
(45) Date of Patent: Jun. 17, 2008

(54) EXPOSING BLUETOOTH COMPLIANT WIRELESS DEVICE CONNECTION AS MODEMS OR SOCKETS

(75) Inventors: Louis J. Giliberto, Redmond, WA (US); Stanley W. Adermann, Sammamish, WA (US); Doran J. Holan, Seattle, WA (US); Husni Roukbi, Seattle, WA (US); Mark Bertoglio, Bellevue, WA (US); Joseph M. Joy, Redmond, WA (US); William Michael Zintel, Kenmore, WA (US); Arvind Murching, Issaquah, WA (US); Kenneth D. Ray, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 156 days.

(21) Appl. No.: 11/327,182

(22) Filed: Jan. 6, 2006

(65) Prior Publication Data

US 2006/0224664 A1 Oct. 5, 2006

Related U.S. Application Data

(63) Continuation of application No. 09/556,567, filed on Apr. 24, 2000, now abandoned.

(51) Int. Cl.
*G06F 15/177* (2006.01)
*G06F 15/16* (2006.01)
*G06F 9/455* (2006.01)
*G06F 3/00* (2006.01)
*G06F 15/173* (2006.01)

(52) U.S. Cl. ........................ 709/222; 703/25; 709/227; 710/16

(58) Field of Classification Search .................... None
See application file for complete search history.

(56) References Cited

U.S. PATENT DOCUMENTS

| 5,566,331 | A | 10/1996 | Irwin et al. |
| 5,727,212 | A | 3/1998 | Dinallo |
| 5,815,682 | A | 9/1998 | Williams et al. |
| 5,918,158 | A | 6/1999 | LaPorta et al. |
| 5,949,776 | A | 9/1999 | Mahany et al. |
| 6,041,075 | A | 3/2000 | Caushik |

(Continued)

OTHER PUBLICATIONS

Specification of the Bluetooth System, v.1.0B, Dec. 1, 1999.

(Continued)

*Primary Examiner*—George C Neurauter, Jr.
(74) *Attorney, Agent, or Firm*—Wolf, Greenfield & Sacks, P.C.

(57) ABSTRACT

A method for providing an interface to a Bluetooth compliant device can emulate a modem such that computer software programs can communicate through the Bluetooth compliant device in the same manner in which they would communicate through a standard modem to access a dial-up, wide area network. The method also supports an interface to a Bluetooth compliant device which can emulate a network socket such that computer software programs can communicate through the Bluetooth compliant device seemingly in the same manner in which they would communicate through a standard network interface card to access a local area network. The method also allows for the interface to a Bluetooth compliant device to be dependent on the nature of the Bluetooth compliant device.

7 Claims, 4 Drawing Sheets

U.S. PATENT DOCUMENTS

| | | | |
|---|---|---|---|
| 6,202,147 | B1 | 3/2001 | Slaughter et al. |
| 6,219,707 | B1 | 4/2001 | Gooderum et al. |
| 6,226,719 | B1 | 5/2001 | Minow |
| 6,255,800 | B1 | 7/2001 | Bork |
| 6,470,397 | B1 | 10/2002 | Shah et al. |
| 6,480,711 | B1 | 11/2002 | Guedalia |
| 6,600,726 | B1 | 7/2003 | Nevo et al. |
| 6,603,744 | B2 | 8/2003 | Mizutani et al. |
| 2002/0012329 | A1 | 1/2002 | Atkinson et al. |

OTHER PUBLICATIONS

Riku Mettala et al., Bluetooth Protocol Architecture (White Paper), v1.0, Nokia Mobile Phones, Sep. 29, 1999.

Brent Miller et al., Mapping Salutation Architecture APIs to Bluetooth Service Discovery Layer (White Paper), v. 1.0, IBM Corporation, Jul. 1, 1999.

IEEE Standard, 802.11, Part 11: Wireless LAN Medium Access Control (MAC) and Physical Layer (PHY) Specifications, 1st Ed. 1999, and Supplements 801.11a-19999 and 802.11b-1999.

Bob O'Hara and Al Petrick, IEEE 802.11 Handbook A Designer's Companion, Dec. 1999.

Pat Megowan et al., IrDA Object Exchange Protocol v1.2, Counterpoint Systems Foundry, Inc. Microsoft Corporation, Mar. 18, 1999.

Universal Plug and Play Device Architecture, v1.0, Microsoft Corporation, Jun. 8, 2000.

Golden G. Richard III, Service Advertisement and Discovery: Enabling Universal Device Corporation, http://computer.org/internet/, Sep.-Oct. 2000.

ETSI TS 101 369 v7.1.0 (Nov. 1999), Digital Cellular Telecommunications System (Phase 2+); Terminal Equipment to Mobile Station (TE-MS) Multiplexer Protocol, Global System for Mobile Communications (GSM 07.10 v7.1.0 Release 1998).

CANT: "Windows Driver Model (WDM) Device Drivers", PHD Computer Consultants Ltd., Copyright 1998, 1999 (13 pgs).

Fleming et al., "Architectural Overview of Intel's Bluetooth Software Stack", Intel Technology Journal Q2, 2000 (10 pgs).

Foley: "Bluetooth User Experience in Windows" (27pgs), Aug. 2004.

Hall et al., "Windows Sockets", Version 1.1 Jan. 20, 1993 (pp. ii and 4-11).

Kardach: "Bluetooth Architecture Overview", (33 pgs), Aug. 2004.

"Bluetooth Design Review—Windows Whistler IRPs for Bluetooth", Microsoft Confidential Draft Version 0.7, Jun. 5, 2000 (23 pgs).

"Plug and Play for Windows NT 5.0", Microsoft Windows NT Server, Copyright 1997 (14 pgs).

"Remote NDIS Specification", Rev. 0.80, Oct. 27, 1999, Microsoft Corporation (50 pgs).

Moore: "Windows Wireless Architecture" (71 pgs).

Ray et al.: "Bluetooth Stack in Windows" (30 pgs).

Tomlinson: "Plug and Play", Windows Developer's Journal—Dec. 1995 (6 pgs).

Udell: Windows NT Up Close: An in-depth look at Microsoft's next-generation operating system:, VYTEm Oct. 1992; p. 167, vol. 17, No. 10 (16 pgs).

"Specification of the Bluetooth System—Core", Dec. 1, 1999, col. 1, Cersion 1/0B, pp. 25-43.

"Specification of the Bluetooth System—Profiles", Dec. 1, 1999, vol. 2, Version 1.0B, pp. 13-93 and 165-242.

Bhagway, Pravin "Networking over Bluetooth: Overview and Issues", Feb. 29, 2000.

"RFCOMM" by Johan Sorensen, dated Dec. 7, 1999.

"RFCOMM on the PC" by Sridhar Rajagopal of Intel Corporation, dated Dec. 7, 1999.

EXPOSING BLUETOOTH COMPLIANT WIRELESS DEVICE CONNECTION AS MODEMS OR SOCKETS

TECHNICAL FIELD

This invention relates generally to wireless interface technology and, more particularly, relates to the interface between computer software applications and wireless devices operating in accordance with the Bluetooth specification.

BACKGROUND OF THE INVENTION

To provide the greatest compatibility between software and hardware components on a computer system, the operating system of the computer defines certain interfaces which can be accessed and used by the programmers of the software components and which are to be provided and supported by the designers of hardware components. Thus, by using the defined interface, the software component can be assured of compatibility with all of the hardware components which support the interface. Similarly, a hardware component providing a specific interface can be assured that software components will be able to locate and access the functionality provided by the hardware component through the interface.

Generally, computers and other electronic devices are interconnected via physical cables or wires. These communication paths allow for the exchange of data or control information between such devices. However, it is increasingly recognized that certain advantages arise from the elimination of cables and wires to interconnect devices. Such advantages include ease of configuration and reconfiguration, due to the elimination of the need to physically add, remove, or displace a physical medium. Furthermore, space which would traditionally be used for device interconnection media may be given to other uses. Furthermore, device mobility is increased through the use of wireless connections.

One method for providing wireless connections between devices employs a light wave in the Infrared region of the electromagnetic spectrum to link devices. The IrDA (Infrared Data Association) protocol defines one such connection mechanism. Unfortunately, such a mechanism must usually operate in a line of sight manner. That is to say that any opaque obstruction between transmitter and receiver will prevent proper operation. Additionally, IR transmitters are typically not omnidirectional when incorporated into a communicating device, so that for proper operation, the transmitter must be pointed generally in the direction of the receiver, within some nominal deviation such as 30 degrees. Finally, IR transmitters are typically fairly low power devices, and accordingly the range of IR links is usually limited to approximately one meter.

Radio frequency links solve many of the problems inherent in Infrared links, however, a radio frequency connection scheme is needed whereby a variety of applications can easily access the radio link through a connection mechanism that provides an appropriate interface. One protocol which defines communication between wireless devices through radio frequency links is the Bluetooth specification. Bluetooth devices do not require a line of sight with one another to operate, and their range can be significantly greater than that of IR links. However, one difficulty with the Bluetooth specification is that very few computer software programs are written to communicate with Bluetooth compliant devices. Another difficulty with the Bluetooth specification is that Bluetooth compliant devices are presented to computer software programs as serial interfaces. There are be numerous situations it which such a serial presentation can be inefficient or even confusing for certain types of computer software applications, such as simple networking applications. Yet another difficulty with the Bluetooth specification is that, while it supports up to 30 emulated RS-232 ports, computer software programs are generally required to know how to communicate through such an emulated port in a device-specific manner.

SUMMARY OF THE INVENTION

Accordingly, the present invention provides a method and computer program product for providing an interface to a Bluetooth compliant device which can emulate a modem such that computer software programs can communicate through the Bluetooth compliant device in the same manner in which they would communicate through a standard modem to access a dial-up, wide area network.

The present invention also provides a method and computer program product for providing an interface to a Bluetooth compliant device which can emulate a network socket such that computer software programs can communicate through the Bluetooth compliant device seemingly in the same manner in which they would communicate through a standard network interface card to access a local area network.

Additionally, the present invention provides a method by which the interface to a Bluetooth compliant device is dependent on the nature of the Bluetooth compliant device.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment.

Although not required, the invention will be described in the general context of computer-executable instructions, such as program modules,. being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules maybe located in both local and remote memory storage devices.

Figure 1:
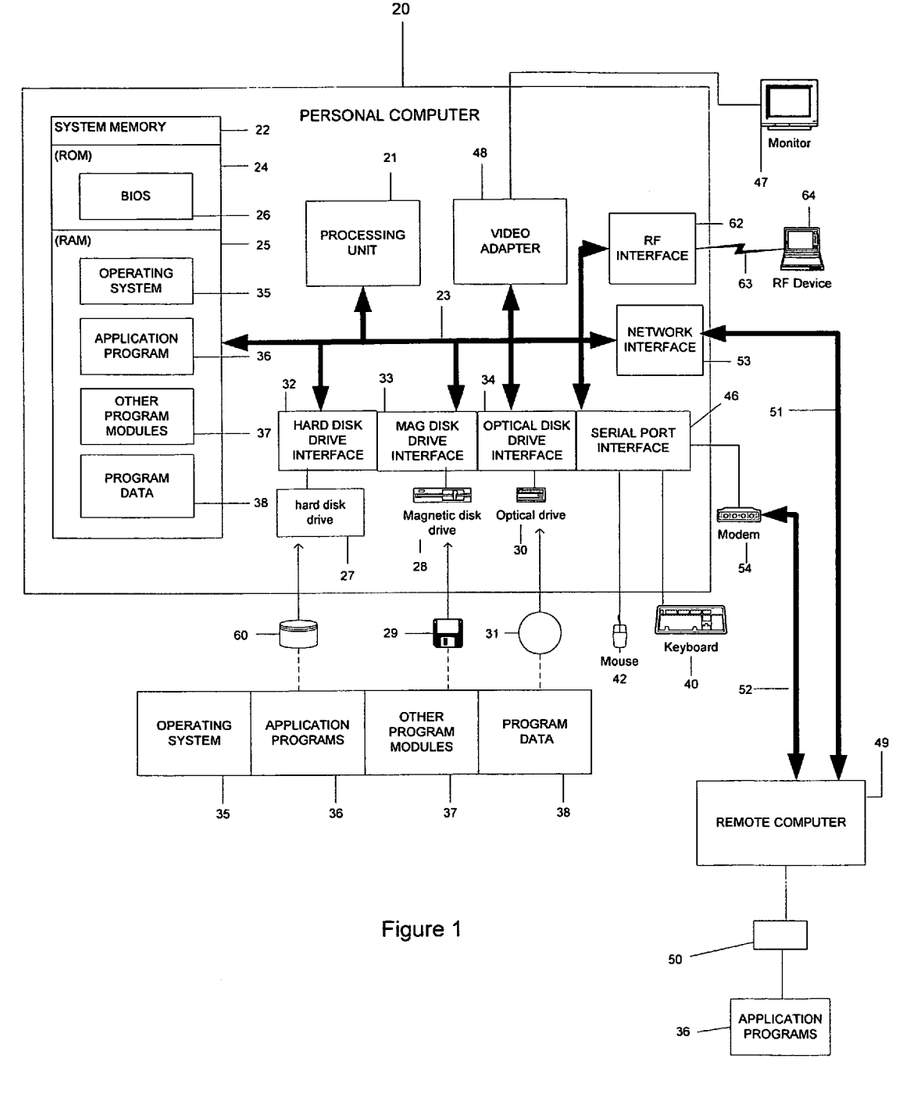
FIG. 1 is a block diagram generally illustrating an exemplary computer system on which the present invention resides.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the personal computer 20, such as during start-up, is stored in ROM 24. The personal computer 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the personal computer 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices, not shown, such as speakers and printers.

The personal computer 20 may operate in a networked environment using logical connections to one or more remote computers or devices, such as a remote computer 49 or RF device 64. The remote computer 49 may be another personal computer, a server, a router, a network PC, a peer device or other common network node, and typically includes many or all of the elements described above relative to the personal computer 20, although only a memory storage device 50 has been illustrated in FIG. 1. The Radio Frequency (RF) device 64 can be a cellular phone, digital camera, another personal computer, or other device which includes the capability to communicate through the RF spectrum. The logical connections depicted in FIG. 1 include a local area network (LAN) 51 and a wide area network (WAN) 52, and an RF connection 63. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the WAN 52. The modem 54, which may be internal or external, is connected to the system bus 23 via the serial port interface 46. When used in conjunction with an RF connection 63, the personal computer 20 includes an RF interface 62. In a networked environment, program modules depicted relative to the personal computer 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operations described hereinafter may also be implemented in hardware.

Figure 2:
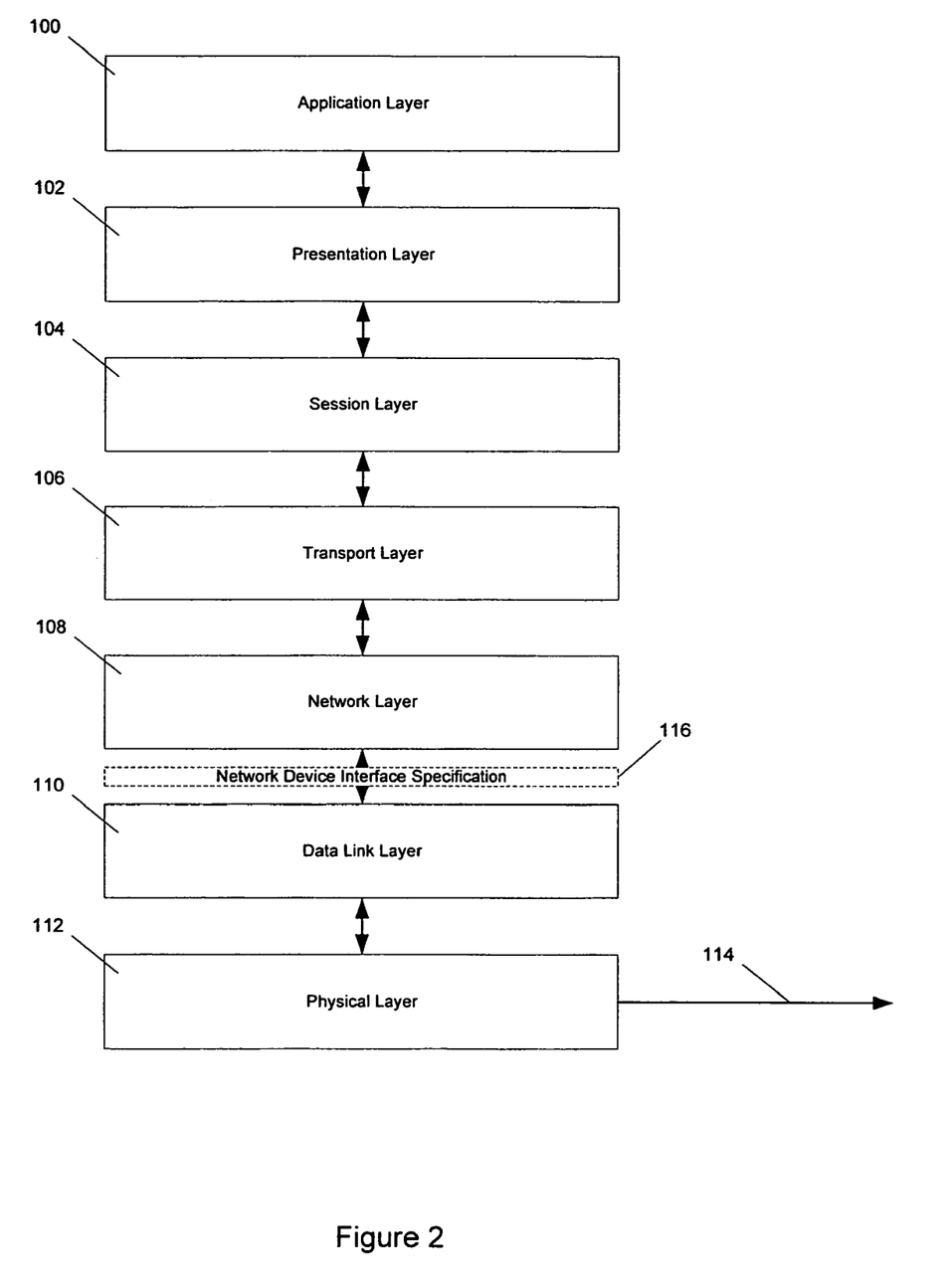
FIG. 2 is a block diagram generally illustrating a seven-layer network model.

In accordance with the invention, and turning to FIG. 2, the Open Systems Interconnection (OSI) seven-layer model is shown. This model is an industry standard abstraction of computer networking. The application layer 100 directly serves the end user and supports the software applications with which the user interacts. The presentation layer 102 provides the mechanisms which interpret data being sent from the application layer 100 on one computer to the application layer on another. The session layer 104 describes the organization of the data being transferred. The transport layer 106 acts as a final error correcting layer to ensure the data is delivered accurately, in the proper sequence, and with no loss or duplication. The network layer 108 defines the addressing and routing of the data across the network. It controls the operation of the local sub-network and decides which physical path the data should take, given network conditions, priority of service, and other factors. The data link layer 110 controls the transmission of blocks of data, or packets, across the network, and provides more fundamental error correction. The data link layer 110 is divided into two sublayers: the logical link control (LLC) sublayer and the media access control (MAC) sublayer. The LLC sublayer ensures error-free transmission of data frames by maintaining logical links, controlling frame flow, sequencing frames, acknowledging frames, and retransmitting unacknowledged frames. The MAC sublayer manages access to the network, checks frame errors and address recognition of the received frames. Protocols which include an LLC sublayer need only a minimal transport layer 106. Finally, the physical layer 112 carries the signals which are sent to the network connection 114. Generally, the physical layer 112 is implemented in the hardware connecting the computer 20 to the network connection 114.

A Network Device Interface Specification (NDIS) 116 can reside between the network layer 108 and the data link layer 110. The NDIS 116 can provide a library of interfaces between the software components and the hardware components. The NDIS 116 can define a fully abstracted environment for network interface card (NIC) driver development by providing routines for every external function that a NIC driver would need to perform. Thus, the NDIS 116 can provide interfaces for communication between a NIC driver and a overlying protocol driver and between a NIC driver and the underlying NIC hardware itself.

Generally the application layer 100, presentation layer 102, session layer 104, transport layer 106, and the network layer 108 are implemented in software components operating on a computer. The data link layer 110 and the physical layer 112 are generally implemented by the hardware components, such as a network interface card. The NDIS 116 library can be used by a software driver implemented in the transport layer 110 to communicate with a network interface card driver implemented at the data link layer 110.

A transport layer driver generally implements a network protocol stack, such as the well known Transfer Control Protocol/Internet Protocol (TCP/IP) stack used on the Internet. If the transport layer software driver has a packet of data to be transmitted, it can call the NIC driver by means of an interface from the NDIS 116 library, and pass down the packet to be transmitted. Similarly, the NIC driver can use an interface of the NDIS 116 to pass the packet to the NIC itself for transmission across the network. The NDIS 116 interface can call the operating system specific components which perform the transmission at the NIC. The NDIS 116 interfaces can also be used by the NIC driver to communicate with the transport layer software driver and pass up a received packet of data, or other information.

According to the "Specification of the Bluetooth System" Version 1.0B (Dec. 1, 1999), incorporated herein by reference in its entirety, RFCOMM supports up to 30 emulated RS-232 (COM) port connections between any two devices. See also the "Windows Wireless Architecture" presentation at Appendix B, the "Bluetooth Architecture Overview" presentation at Appendix C, the "Bluetooth Experience in Windows" presentation at Appendix D, and the "Bluetooth Stack in Windows" presentation at Appendix E. However, Dial-Up Networking (DUN) connections provide specific services that are best presented as a modem. Accordingly, when a DUN profile is exposed as a COM port rather than as a modem connection, the relevant client application must have the ability to communicate in a device-specific way with a device.

In keeping with an embodiment of the invention, DUN services are exposed by RFCOMM to the application as a modem connection, allowing the client application to use standard Telephony API (TAPI) and Unimodem interfaces. Thus applications and services which are not specifically adapted for use within the Bluetooth protocol can nonetheless utilize a communications device as a standard communications device, hiding the implementation-specific differences between Bluetooth and Dial-up Networking connections.

Figure 3:
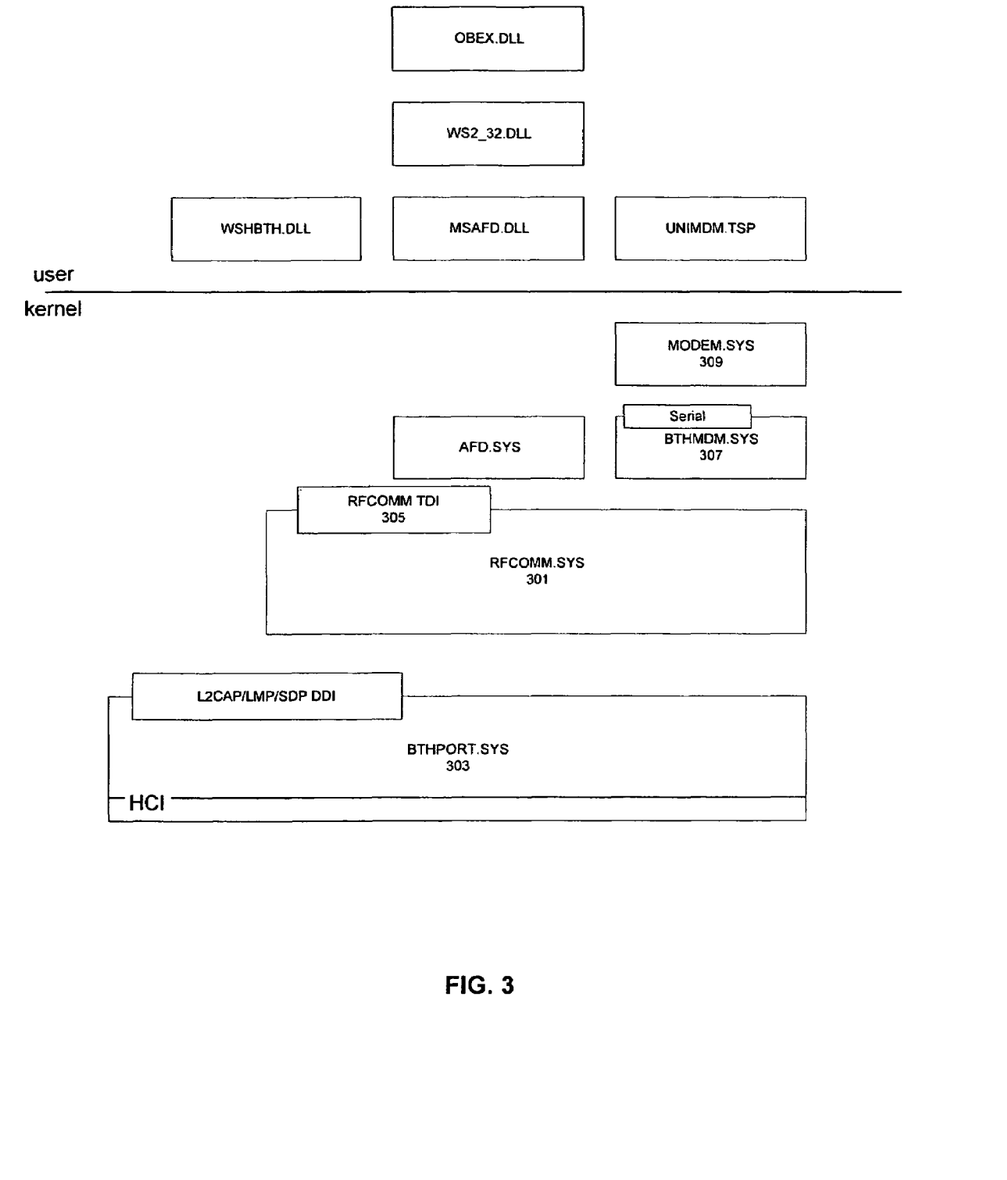
FIG. 3 is an architectural diagram of various system components used in an embodiment of the invention.

RFCOMM is implemented as described in the "Specification of the Bluetooth System" Version 1.0B Part F1 entitled "RFCOMM with TS 07.10 incorporated herein by reference in its entirety and attached at Appendix A, with certain changes to effect the desired functionality. The following components, most of which appear in the architectural diagram of FIG. 3, are used to expose a Bluetooth RFCOMM Dial-Up Networking connection as a modem rather than as a COM port: RFCOMM.SYS (the Bluetooth RFCOMM driver) 301; BTHPORT.SYS (the Bluetooth port driver implementing L2CAP and HCI.) 303; TDI (transport device interface) 305; PnP (the "Plug'N'Play" system); BTHMDM.SYS (the Bluetooth modem driver) 307; and MODEM.SYS (the Unimodem driver) 309. As one of skill in the art will know, the Plug'N'Play system is a combination of hardware and software support that enables a computer system to recognize and adapt to hardware configuration changes with little or no user intervention.

When a new device conforming to the Bluetooth specification is detected by the computer, BTHPORT.SYS enumerates the new device as a Physical Device Object (PDO). As is known by those of skill in the art, a PDO represents the whole range of functionality available to a component. RFCOMM is alerted to this new device by way of BTHPORT.SYS. RFCOMM.SYS is loaded as the Functional Device Object (FDO) by the Plug'N'Play system (PnP). As is also known by those of skill in the art, an FDO represents a set of functions of device available to a function driver.

RFCOMM examines the Service Discovery Protocol (SDP) database of the remote RFCOMM device. If the remote device is a DUN device, RFCOMM enumerates a new PDO. For Bluetooth LAN access points and PC's acting as LAN access points, RFCOMM.SYS enumerates a PDO that will load an instance of a Null modem device in BTHMDM.SYS. For Bluetooth modems acting as a Gateway (GW), RFCOMM.SYS will enumerate a PDO that will load an instance of a modem device in BTHMDM.SYS. BTHMDM.SYS communicates to RFCOMM using IO request packets (IRP's) via the TDI interface. Alternatively, BTHMDM.SYS may communicate with IRP's that are not restricted to TDI requests, but that are still Windows Driver Model (WDM) requests.

BTHMDM.SYS exposes an interface to MODEM.SYS that provides a functional equivalent of the standard Windows 2000 SERIAL.SYS driver. This has the effect of emulating an RS-232 modem connection from the viewpoint of MODEM.SYS. MODEM.SYS then provides a Unimodem interface to Unimodem clients such as TAPI, allowing the device to be addressed as a standard communications device, e.g. a modem.

To permit peer-to-peer DUN communications between two PC's, it is preferable that one of the PC's acts as a server. The server PC preferably populates its SDP database with and appropriate DUN entry so that the client can identify and connect with it. This is preferably performed at the time that the RFCOMM driver loads, either at system start up, or at the time that the Bluetooth device is connected to the system. RFCOMM.SYS will automatically generate a PDO to represent the server channel to BTHMDM.SYS, such that the server software may be initialized and ready to handle an incoming connection request.

When a client attempts to connect to the DUN server, BTHPORT.SYS will generate a PDO to represent the new connection. RFCOMM will create an FDO and associate it with the new PDO. However, instead of generating a new PDO for the modem driver, RFCOMM will associate the new PDO and FDO with the already existing PDO being handled by the DUN server.

The communication mechanism described above with reference to Bluetooth DUN connections also applies to dependant profiles such as the LAN access profile and the FAX profile.

According to another embodiment of the invention, RFCOMM is alerted to a new connection by BTHPORT.SYS, as was described in more detail above. If, after examining the SDP database of the new connection, as described above, RFCOMM determines that the connection is not a dial-up networking device, RFCOMM will allow access to the device through the RFCOMM TDI interface. As is known by those of skill in the art, the TDI is the interface which allows higher level components access to the transport layer, which was described in more detail above. This access is extended to the user mode level by AFD.SYS. It is AFD.SYS which provides this access to WinSock. In such a manner, the new device is assigned its own socket and treated in a manner analogous to a network card.

Each transport protocol defines an address that describes endpoint information associated with address objects that are open in the transport layer. The TDI address of an RFCOMM endpoint can be defined as follows:

```
#define BTH_ADDR_LEN           48
#define BTH_ANY_CHANNEL_NUMBER (UNLONG) -1
typedef BD_ADDR UCHAR[BTH_ADDR_LEN]
typedef struct TDI_ADDRESS_BLUETOOTH {
    ULONG    ChannelNumber;
    BD_ADDR  BdAddr;
} TDO_ADDRESS_BLUETOOTH;
```

Where the TDI_ADDRESS_BLUETOOTH type defines an RFCOMM channel number of the endpoint, if it is supported by the RFCOMM stack. Alternatively, ChannelNumber can specify an L2CAP channel number.

As described above, the TDI allows higher level components to access the transport layer. Such a higher level component is known as a client of the TDI. A client of the TDI can open a server endpoint for accepting incoming connections by any number of methods. One method for doing so is to include a TDI_ADDRESS_BLUETOOTH with a ChannelNumber of either BTH_ANY_CHANNEL_NUMBER or an RFCOMM channel number between one and thirty. Specifying BTH_ANY_CHANNEL_NUMBER will let RFCOMM select an unused channel number. If the client manually selects a channel number and it is in use, the opening of the address object will fail with TDI_ADDR_IN_USE. BdAddr can be set to zero. Another method of opening a server endpoint for accepting incoming connections is to open a connection object and associate it with the above address object. This will be the connection object for the first incoming connection. Because RFCOMM can limit a server channel to just one connection per remote device it is generally not necessary to create a backlog of connection objects for incoming connections. After accepting an incoming connection, the TDI client can simply create another connection object and associate it with the above address object for the next incoming connection.

A TDI client can also open a connection to a remote device through a number of methods. One method for doing so is to open an address object, including a TDI_ADDRESS_BLUETOOTH with a ChannelNumber set to zero. A ChannelNumber of zero indicates that the address object will be used for an outbound connection and the stack will not reserve a server channel number for it. BdAddr can be set to zero. Another method of opening a connection to a remote device is to open a connection object and associate it with the address object. Yet another method of opening a connection to a remote device is to issue a TDI connect request IRP on the connection object. The IRP will contain a TDI_ADDRESS_BLUETOOTH with the BdAddr of the remote device and the destination ChannelNumber.

Existing implementations of the Bluetooth specification map remote devices to a generic serial-type device. Unfortunately, proper configuration of such a system requires user knowledge regarding serial port technology. In an embodiment of the present invention, RFCOMM connections of a particular type are automatically routed to an appropriate corresponding device type within the Microsoft brand WINDOWS operating system using the SDP. Broadly, if a device is not a DUN device, then RFCOMM will allow access to that device through the TDI interface. This access is extended to user mode by AFD.SYS (standard Winsock service provider for transports). In order to allow TDI's addressing model to multiplex multiple connections to the same RFCOMM channel on different RFCOMM sessions, the RFCOMM channel number/remote Bluetooth address pair of the endpoint uniquely identifies each RFCOMM connection. In contrast to the DUN profile, Winsock and AFD will be required to create device objects and handles in a mechanism consistent with existing TDI applications.

Figure 4:
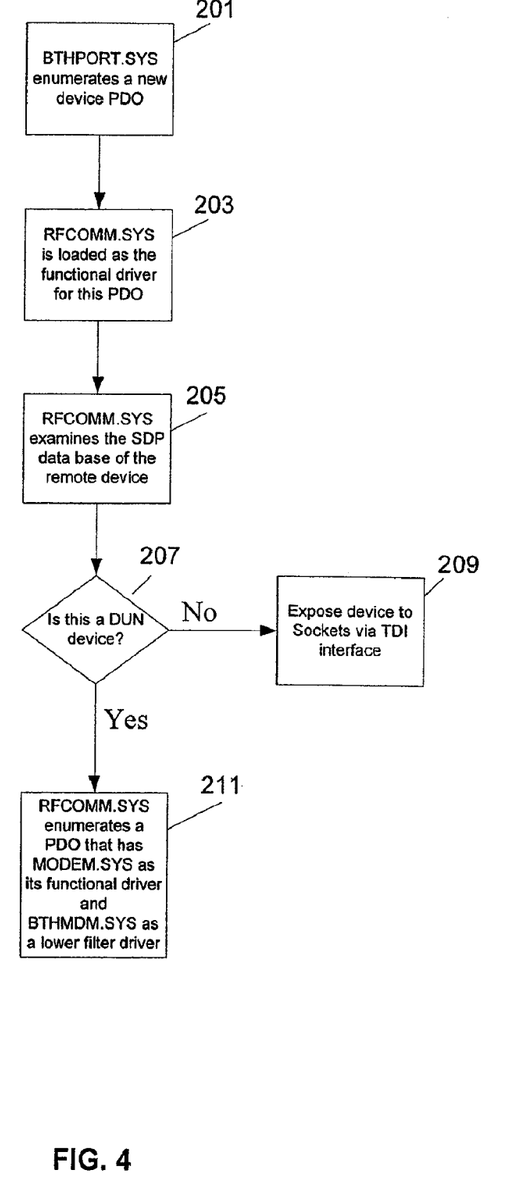
FIG. 4 is a flow chart illustrating steps taken in an embodiment of the invention to interface applications of different types to a radio frequency link.

In greater detail, with reference to step 201 of FIG. 4, BTHPORT.SYS initially enumerates a new device PDO. Subsequently, in step 203, RFCOMM.SYS is loaded as the functional driver for this PDO. In step 205, RFCOMM.SYS examines the SDP data base of the remote device to determine device type. If in step 207 it is determined that the device is a DUN device, then in step 211 RFCOMM.SYS enumerates a PDO that has MODEM.SYS as its functional driver and BTHMDM.SYS as a lower filter driver. Otherwise, in step 209, the device is exposed to an API such as Windows Sockets via the TDI interface.

All of the references cited herein, including patents, patent applications, and publications, are hereby incorporated in their entireties by reference.

In view of the many possible embodiments to which the principles of this invention may be applied, it should be recognized that the embodiment described herein with respect to the drawing figures is meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

The invention claimed is:

1. For use in a computer, a method of automatically exposing a remote RFCOMM device to an application through sockets via RFCOMM, the method comprising the steps of:
   detecting a new connection to the remote RFCOMM device and assigning a socket to the remote RFCOMM device for communications between the application and the remote RFCOMM device;
   determining whether the remote RFCOMM device is a dial-up networking device; and in response to determining that the remote RFCOMM device is not a dial-up networking device, allowing the application access to the remote RFCOMM device through an interface to a transport layer of the computer.

2. A method of automatically routing an RFCOMM connection to an appropriate device type comprising the steps of:
   detecting a new RFCOMM device for connection and assigning a socket to the remote RFCOMM device for communications between the application and the remote RFCOMM device;
   determining whether or not the new RFCOMM device is a dial-up networking device; and in response to determining whether or not the new RFCOMM device is a dial-up networking device:
   enumerating a physical device object associated with the new RFCOMM device when it is determined that the new RFCOMM device is a dial-up networking device; and
   exposing a new RFCOMM device to an application by way of a transport driver interface when it is determined that the new RFCOMM device is not a dial-up networking device.

3. A method of using a BLUETOOTH-aware transport service module for connecting a legacy application lacking any BLUETOOTH-specific functions to a
   remote BLUETOOTH device in a manner that is transparent to the application, wherein the legacy application is hosted on a first computer and wherein the first computer also hosts a BLUETOOTH communications stack, and wherein the remote BLUETOOTH device is connectable to the first computer via a BLUETOOTH radio link, the method comprising:
   automatically detecting at the transport service module on the first computer the presence of the remote BLUETOOTH device;
      determining automatically at the transport service module whether the remote BLUETOOTH device is a dial-up network device; and
   in response to determining whether the remote BLUETOOTH device is a dial-up network device, automatically assigning at the transport service module an interface to the remote BLUETOOTH device, wherein the interface allows the legacy application to utilize at least a portion of the BLUETOOTH communications stack to communicate with the remote BLUETOOTH device, wherein when it is determined that the remote BLUETOOTH device is a dial-up network device, the interface appears to the application as a standard modem interface;
   wherein automatically assigning, at the transport service module an interface to the remote BLUETOOTH device, further comprises assigning a socket to the remote BLUETOOTH device for communications between the application and the remote BLUETOOTH device.

4. The method according to claim 3, wherein the interface assigned to the remote BLUETOOTH device comprises a UNIMODEM interface.

5. The method according to claim 3, wherein the interface assigned to the remote BLUETOOTH device comprises a Telephony API.

6. The method according to claim 3, wherein the interface allows the application to treat the remote BLUETOOTH device as a standard network interface card.

7. The method according to claim 3, wherein the remote BLUETOOTH device is a dial-up networking device associated with a second computer, the method further comprising using the interface assigned to the remote BLUETOOTH device to execute peer-to-peer communications between the first and second computers.

* * * * *